Sept. 26, 1950           C. J. HOLM           2,523,827

REEL FOR FISHING RODS

Filed Oct. 8, 1947

Inventor:
C. J. Holm

Patented Sept. 26, 1950

2,523,827

UNITED STATES PATENT OFFICE 2,523,827

REEL FOR FISHING RODS

Carl Julianus Holm, Trondheim, Norway

Application October 8, 1947, Serial No. 778,561
In Norway March 19, 1945

Section 1, Public Law 690, August 8, 1946
Patent expires March 19, 1965

2 Claims. (Cl. 242—84.1)

The present invention relates to a reel for fishing rods of the kind in which the reel drum is adapted to be detached from the reel housing.

In accordance with the invention the drum is detachably mounted on a sleeve which is rotatably mounted on a spindle in the reel housing or frame, the drum being secured to the sleeve by means of an easily operated locking device.

In this manner the wear which would be caused by the mounting and dismounting of the detachable drums on the drum spindle is avoided and more particularly the locking device is not exposed to wear as is the case in other reels with detachable drums, as the locking member in accordance with the present invention remains stationary with relation to the sleeve on which the drum is mounted. Furthermore the drum in accordance with the present invention is cheap to manufacture as it need not carry any parts of the reel mechanism, these being secured to the rotating sleeve.

On the drawing an embodiment of the invention is illustrated.

Figure 1:
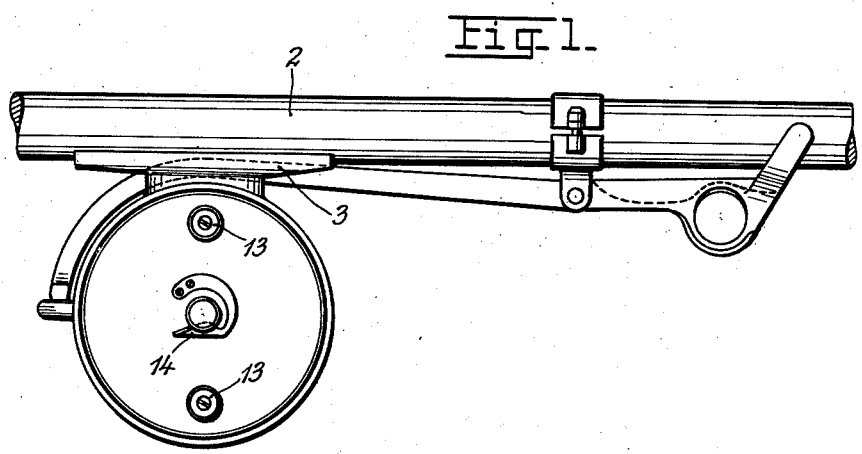
Fig. 1 is a side view on a reduced scale of part of a fishing rod with the reel mounted on the underside.
Figure 2:
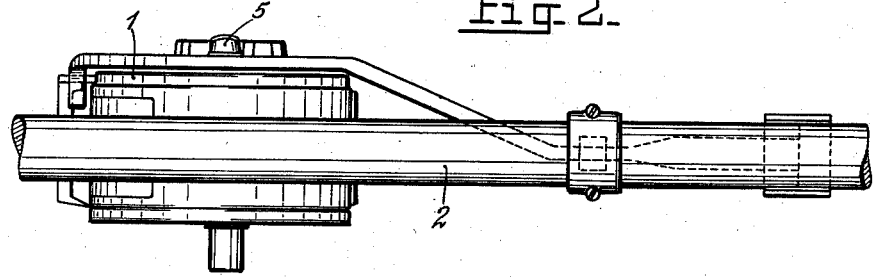
Fig. 2 is a view of the same seen from above.

The reel housing 1 is made in the form of an open box with a suitable opening in its side surface and is secured to the fishing rod 2 by means of a base 3. A stationary spindle 4 is located centrally in the housing by means of a nut 5.

On spindle 4 is rotatably mounted a sleeve 6 which is kept in position on the spindle by means of an elastic split annular disk 8 which fits into a groove in spindle 4.

A small clearance, as indicated at 7, between spindle 4 and sleeve 6 permits the latter to rotate easily on the spindle.

Sleeve 6 has two conical ribs 9 and 10 forming seats for drum 11 which comprises two annular disks provided with conical flanges fitting the conical seats 9 and 10 and interconnected by means of a perforated cylindrical member. One of the conical seats 9 is provided with a groove adapted to be engaged by a rib 12 of the corresponding conical flange of the drum.

Figure 3:
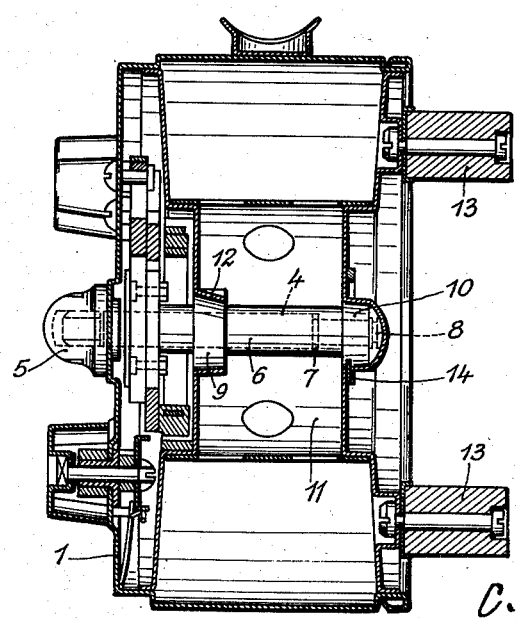
Fig. 3 is a section through the reel with the drum in position.

On the exterior side surface of the drum the handles 13, 13 are secured in the usual manner. The drum is locked to sleeve 6 by means of an elastic locking member 14 (Figs. 1 and 3) which passes through an opening in the exterior conical seating flange of the drum and engages a recess in the conical seat 10 of the sleeve. As during operation there is no movement between drum and sleeve neither of these parts are exposed to wear during rotation, and the drum is maintained securely in its position.

The spool is assembled on the reel merely by placing the conical flanges of the drum onto the conical ribs on the sleeve. The member 14 is elastic or resilient and can be easily and quickly moved so as to engage or disengage the projecting portion shown in dotted lines in Figure 1 into or out of the opening and recess in the conical flange and conical rib.

I claim:

1. A reel for fishing rods comprising a housing, a stationary spindle secured in said housing, a sleeve rotatably mounted on said spindle, an elastic split annular disk maintaining said sleeve on said spindle, spaced conical ribs on said sleeve, a drum having spaced conical flanges thereon, said conical flanges coacting with said conical ribs for mounting said drum on said sleeve, an elastic locking member secured to said drum and being of arcuate shape, one said conical flange on said drum having an opening therethrough, a recess in one said conical rib on said sleeve, a free end of said elastic locking member passing through said opening in said conical flange of said drum and engaging in said recess in said conical rib, said elastic locking member being operable to attach or remove said drum to or from said rotatably mounted sleeve.

2. A reel for fishing rods as claimed in claim 1, and wherein said conical rib remote from the said rib having the recess therein is provided with a groove, the conical flange of said drum engaged with said rib having said groove therein having a rib for engagement with said groove for positioning said drum on said sleeve.

CARL JULIANUS HOLM.

REFERENCES CITED

The following references are of record in the file of this patent:

FOREIGN PATENTS

| Number | Country | Date |
|---|---|---|
| 20,908 of 1935 | Australia | Jan. 10, 1936 |